March 7, 1950     R. J. MILLER     2,500,002
ROTARY FLUID COUPLING
Filed July 31, 1943     3 Sheets-Sheet 1
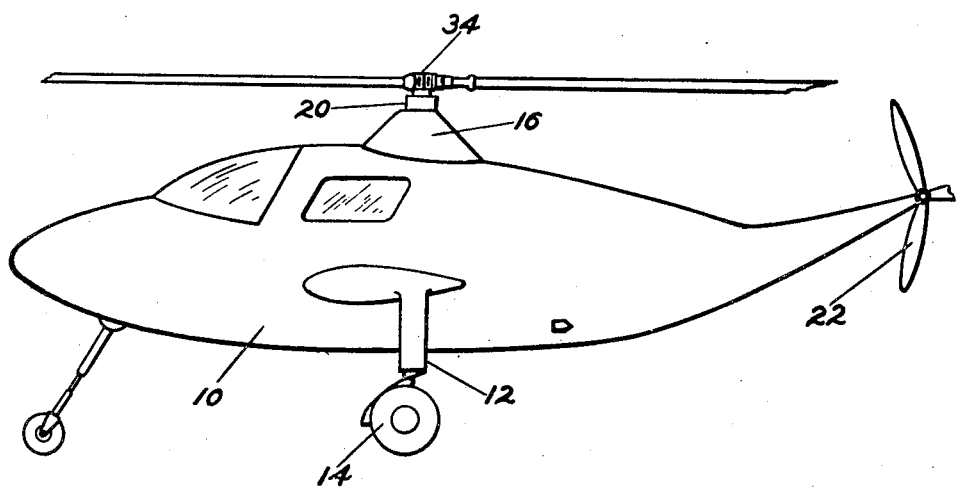
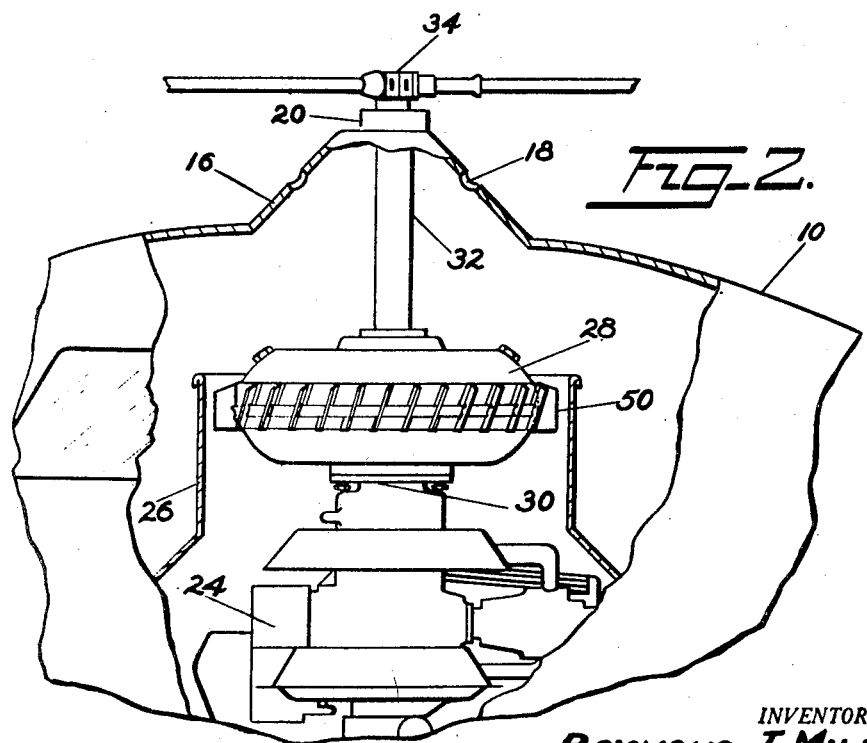
INVENTOR.
RAYMOND J. MILLER
BY
ATTORNEY

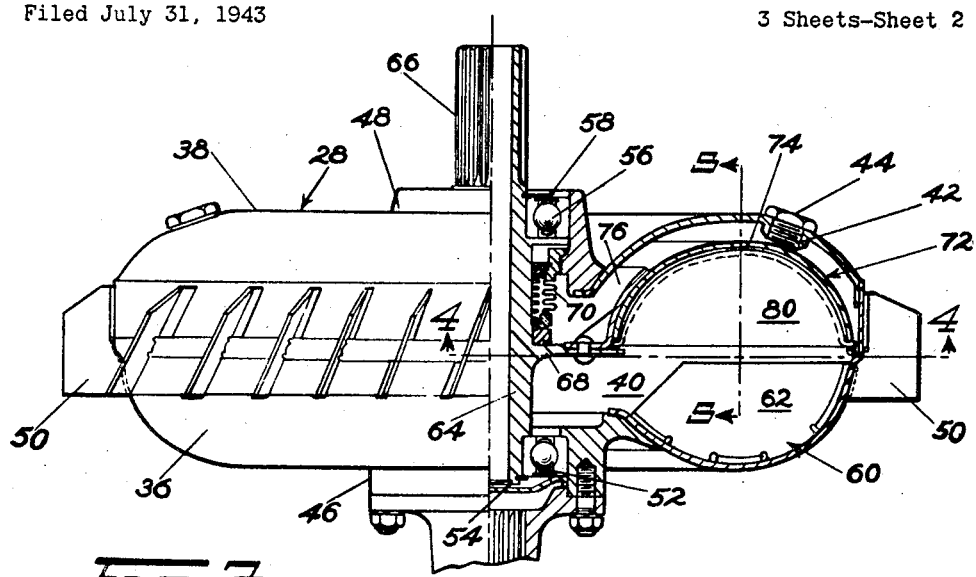
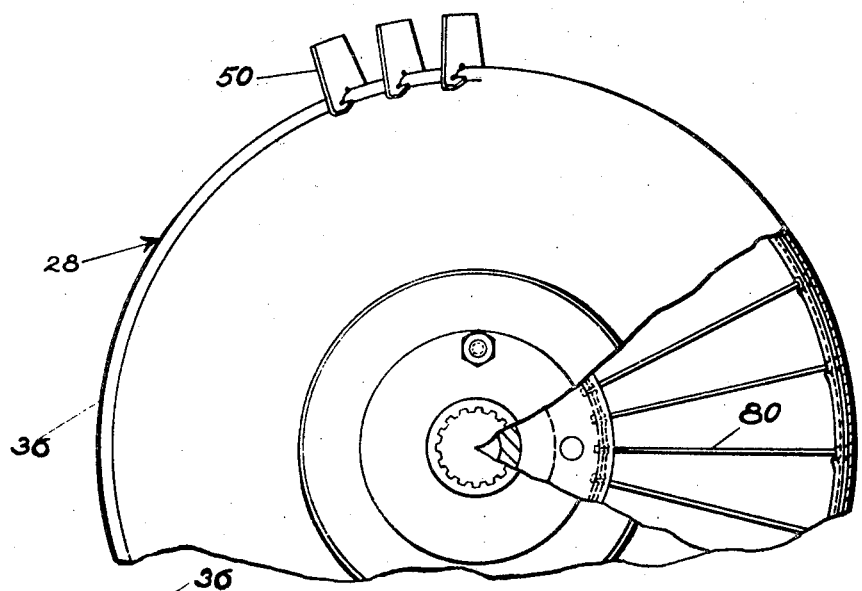
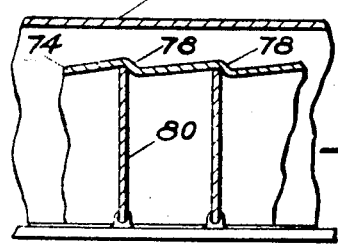

March 7, 1950 R. J. MILLER 2,500,002
ROTARY FLUID COUPLING
Filed July 31, 1943 3 Sheets-Sheet 3
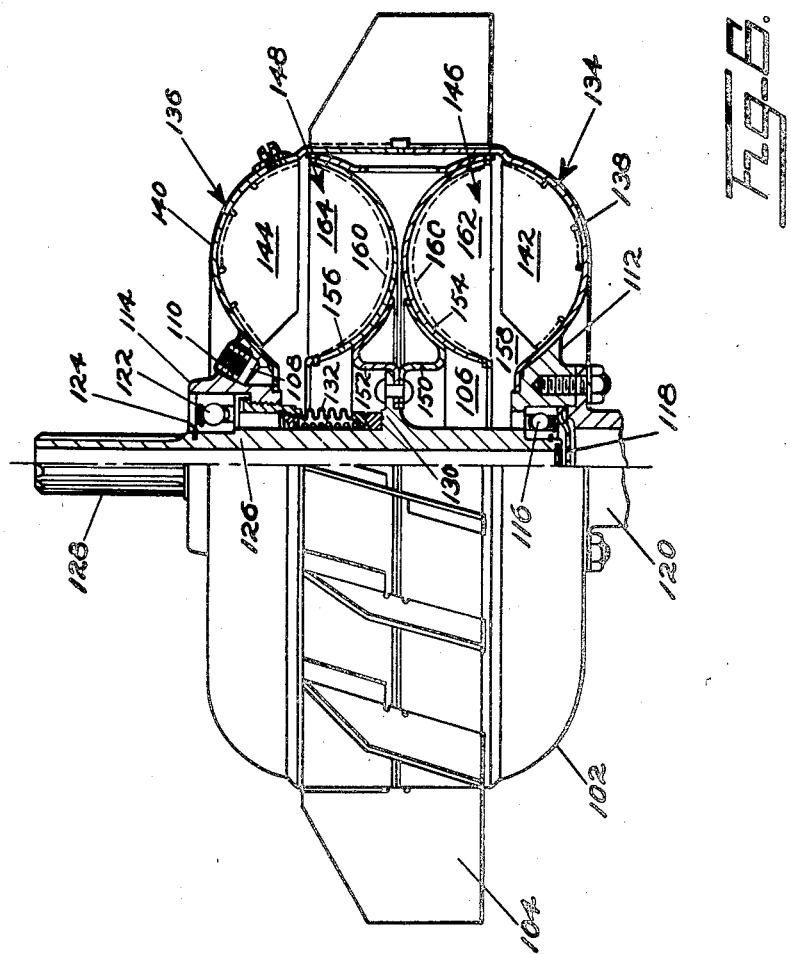
INVENTOR.
RAYMOND J. MILLER
BY
ATTORNEY.

Patented Mar. 7, 1950

2,500,002

UNITED STATES PATENT OFFICE 2,500,002

ROTARY FLUID COUPLING

Raymond J. Miller, Detroit, Mich., assignor to Bendix Aviation Corporation, Detroit, Mich., a corporation of Delaware Application July 31, 1943, Serial No. 496,933

2 Claims. (Cl. 60—54)

This invention relates to helicopters, and more particularly to fluid drives therefor.

Broadly the invention comprehends a fluid coupling adapted to be connected between a prime mover and the rotor of a helicopter; however, it is suitable for other uses.

An object of the invention is to provide a fluid coupling of simple structure, one having but few parts, which may be made of small stampings.

Another object of the invention is to provide a fluid coupling of such structure that the driven shaft may overrun the driving shaft without the introduction of excessive frictional resistance between the driving and driven elements of the coupling.

Yet another object of the invention is to provide a fluid coupling wherein the driven element of the coupling may remain static when the driving element of the coupling is rotating at the idling speed of an associated power plant.

Other objects and advantages of the invention will appear from the following description taken in connection with the drawings forming a part of this specification, and in which—

Fig. 1 is a side elevation of a helicopter embodying the invention;

Fig. 2 is an enlarged fragmentary view of Fig. 1;

Fig. 3 is a sectional view of the fluid coupling;

Fig. 4 is an end view partly broken away on line 4—4 of Fig. 3;

Fig. 5 is a detail view of the runner in section on line 5—5 of Fig. 3; and

Fig. 6 is a modification illustrating a duplex fluid coupling embodying the invention.

Referring to the drawings for more specific details of the invention, 10 represents a conventional fuselage supported on an undercarriage 12, preferably of the tricycle type, equipped with wheels 14. The fuselage has a superimposed pylon or truncated structure 16 having openings 18 for venting the fuselage to the atmosphere, and mounted on the pylon is a reduction gear box 20 having reduction gears therein and controls therefor, not shown, and suitably mounted on the tail of the fuselage is a small rotor 22 also having conventional controls, not shown. This rotor counteracts the torque caused by the main rotor.

A power plant or an internal combustion engine 24 of any preferred type is suitably mounted in the fuselage beneath the pylon, and a suitable cowl 26 surrounds and extends slightly above the engine. A fluid coupling indicated generally at 28 is positioned in the entrance of the cowl, and the impeller of the coupling is connected to a flange 30 on the crankshaft of the engine. The runner of the coupling is connected to a driven shaft 32 extended upwardly through the pylon into the reduction gear box 20, and is connected through the reduction gear to a large rotor 34 having variable pitch blades and suitable controls therefor, not shown.

The fluid coupling 28 includes an annular housing preferably made in two stampings 36 and 38 fitted and fixedly secured together to provide a chamber 40 having a filling opening 42 normally closed as by a plug 44. The housing 28 has axially disposed hubs 46 and 48, and fan blades 50 are suitably mounted on the periphery of the housing.

The hub 46 is adapted to be secured to the crankshaft flange 30 of the motor. This hub has therein a bearing 52 and a closure plate 54, both held against displacement by the flange 30, and, correspondingly, the hub 48 has therein a bearing 56 held against displacement by a closure plate 58. The housing also carries an impeller indicated generally at 60. The impeller includes the wall of the housing section 36, constituting an outer shroud, and spaced blades 62 suitably secured to the inner wall of the housing.

A stub shaft 64 mounted for rotation on the bearings 52 and 56 is splined as indicated at 66 for the reception of the driven shaft 32. The shaft has thereon a circumferential flange 68, and interposed between this flange and the hub 48 is a fluid seal 70 for inhibiting seepage of fluid from the housing.

A runner indicated generally at 72 for cooperation with the impeller 60 includes a shroud 74 welded or otherwise secured to a reinforcing ring 76 riveted to the flange 68 on the stub shaft. The shroud 74 is circular, and semi-cylindrical in cross-section, and the wall of the shroud has spaced radially disposed ribs or shoulders 78, and vanes 80 pivotally mounted in the wall of the shroud adjacent the edges thereof are adapted to fold down upon one another or to swing upwardly against the shoulders 78.

In operation, assuming that the chamber 40 is filled with suitable oil and that the housing of the coupling and, accordingly, the impeller 60 carried thereby, is rotating at engine drive shaft speed—the impeller energizes the fluid and the energy of the fluid is absorbed by the vanes 80 of the runner. Initially the vanes swing on their pivots against the shoulders 78, and thereafter force is transmitted from the runner through the shafts 66 and 32, and the gear reduction system in the box 20, to the rotor 34.

Any tendency of the rotor to overrun the engine results in the vanes 80 swinging on their pivots to a position wherein no torque can be transmitted from the runner to the impeller. When the rotor overruns the impeller the fluid in the circuit impinges on the backs of the vanes, and this causes the vanes to swing into and feather in the fluid flow.

When the rotor slows down, the fluid in the circuit is again energized by the impeller, and the energy of the fluid is absorbed on the faces of the vanes. This causes the vanes to again swing on their pivots to position against the shoulders 78, and this completes the cycle.

Sufficient flywheel effect is attained in the impeller housing and fluid therein to permit the engine to idle smoothly while the rotor, the speed reduction system, and the runner of the coupling remain stationary.

A modification of the invention is illustrated in Fig. 6. In this embodiment of the invention a housing 102 has arranged on its perimeter spaced fan blades 104. The housing provides a chamber 106 having a filling opening 108 normally closed as by a plug 110, and the chamber has oppositely disposed hubs 112 and 114.

The hub 112 supports a bearing 116, and a closure plate 18 fitted tightly in the hub 12 serves to retain the bearing against displacement. The closure plate 118 is held in place by the flange of a crankshaft 120 bolted or otherwise secured to the hub, and the hub 114 supports a bearing 122 held against displacement by a retainer ring 124 fitted in the hub.

A stub shaft 126 is supported for rotation on the bearings 116 and 122. The shaft extends beyond the wall of the housing and is splined as indicated at 128 for the reception of a driven shaft, not shown. The shaft has a circumferential flange 130, and a fluid seal 132 is interposed between the flange and the hub 114 for inhibiting seepage of fluid from the chamber 106.

The housing 102 is preferably made in two like parts constituting oppositely disposed impellers 134 and 136. The end walls of the housing constitute the shrouds 138 and 140 of the impellers, and arranged on the shrouds are spaced impeller blades 142 and 144.

Corresponding runners, indicated generally at 146 and 148, are supported on brackets 150 and 152 secured to the flange 130 on the stub shaft 126. The runners include shrouds 154 and 156 arranged back-to-back and in oppositely disposed relation to the impellers 134 and 136, and provide in conjunction therewith a vortex chamber 158.

The shrouds of the runners are circular and semi-cylindrical in cross-section, and are provided with spaced shoulders or ribs 160, and pivoted in the walls of the shrouds are vanes 162 and 164 adapted to swing under the influence of dynamic pressure of the fluid in the vortex chamber and abut the shoulders 160 when the fluid energized by the impellers impinges on the faces of the vanes.

The mode of operation is substantially identical to that of the preferred embodiment of the invention.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid coupling comprising an impeller, a runner for cooperation therewith including a shroud having spaced semi-circular shoulders radially disposed to the axis of the coupling, and vanes having free ends complementary to the shoulders, said vanes being pivoted in the wall of the shroud and adapted to swing against the shoulders.

2. A fluid coupling comprising a housing having oppositely disposed hubs, a shaft journaled in the hubs, a runner on the shaft within the housing, said runner including a shroud having spaced semi-circular shoulders and vanes carried by the shroud adapted to swing against the shoulders during one phase of operation and to fold upon one another during another phase of operation, and an impeller for cooperation with the runner.

RAYMOND J. MILLER.

REFERENCES CITED

The following references are of record in the file of this patent:

UNITED STATES PATENTS

| Number | Name | Date |
|---|---|---|
| 1,032,892 | Goudard et al. | July 16, 1912 |
| 1,047,948 | Karminski | Dec. 24, 1912 |
| 1,327,080 | Brown | Jan. 6, 1920 |
| 1,901,988 | Rudqvist | Mar. 21, 1933 |
| 1,927,040 | Klimek | Sept. 19, 1933 |
| 1,971,734 | Stalker | Aug. 28, 1934 |
| 2,168,862 | De Lavaud | Aug. 8, 1939 |
| 2,212,774 | Guyer | Aug. 27, 1940 |
| 2,222,618 | Jandasek | Nov. 26, 1940 |
| 2,240,270 | Schaefer | Apr. 29, 1941 |
| 2,297,196 | Berger | Sept. 29, 1942 |
| 2,319,781 | Pullin | May 25, 1943 |
| 2,337,570 | Pullin | Dec. 28, 1943 |

FOREIGN PATENTS

| Number | Country | Date |
|---|---|---|
| 458,358 | Germany | 1928 |
| 452,922 | Great Britain | Sept. 1, 1936 |
| 744,956 | France | Jan. 31, 1933 |